United States Patent [19]

MacLeod

[11] 4,325,107
[45] Apr. 13, 1982

[54] RECHARGEABLE FLASHLIGHT

[76] Inventor: Richard H. MacLeod, 15919 State Rte. 2, Waseon, Ohio 43567

[21] Appl. No.: 116,620

[22] Filed: Jan. 29, 1980

[51] Int. Cl.³ .............................. F21L 9/00; F21L 7/00
[52] U.S. Cl. ..................................... 362/183; 362/207; 362/208
[58] Field of Search ........................ 362/183, 207, 208

[56] References Cited

U.S. PATENT DOCUMENTS

| | | | |
|---|---|---|---|
| 2,231,382 | 2/1941 | Desimone | 362/207 |
| 2,271,421 | 1/1942 | Gits | 362/207 |
| 2,341,057 | 2/1944 | Muldoon | 362/207 |
| 2,599,253 | 6/1952 | Gits | 362/207 |
| 3,265,880 | 8/1966 | Whitman | 362/207 |
| 3,281,637 | 10/1966 | Hultquist | 362/183 |
| 3,441,730 | 4/1969 | Doring et al. | 362/183 |
| 3,749,905 | 7/1973 | Friedman et al. | 362/183 |
| 3,787,678 | 1/1974 | Rainer | 362/183 |
| 3,825,740 | 7/1974 | Friedman et al. | 362/183 |
| 4,152,755 | 5/1979 | Trosper et al. | 362/208 |

Primary Examiner—Benjamin R. Padgett
Assistant Examiner—Irwin Gluck
Attorney, Agent, or Firm—Haverstock, Garrett & Roberts

[57] ABSTRACT

An improved rechargeable flashlight having a casing of dielectric material including adapter means for recharging the batteries from a power source such as a battery in a vehicle, said adapter means including a phono plug terminal mating with a phono jack in the flashlight's casing wall and a terminal plug for insertion into a conventional cigarette lighter receptacle on a vehicle's dashboard, said terminal plug having a current limiting resistor in the charging circuit to provide a safe charging voltage and current to the rechargeable batteries in the flashlight and preferably an LED (light emitting diode) is in the charging circuit to indicate charging current is being received from the charging source and accepted by the flashlight batteries. Further included is an integral cross-member within the flashlight casing serving as a fixed partition between the batteries in the flashlight casing and the flashlight bulb thereby isolating the bulb against shock impact from battery movement, an on-off switch mechanism comprising an internal bus bar which is movable fore and aft in the flashlight casing and has at one end an electrical connection to the photo plug socket in the flashlight casing wall and at its other end a continuous electrical contact with a metal sleeve attached to the interior wall of the casing and a flexible spare bulb holder insertable in the flashlight's rear end cap.

This invention relates to improvement in rechargeable flashlights.

13 Claims, 12 Drawing Figures

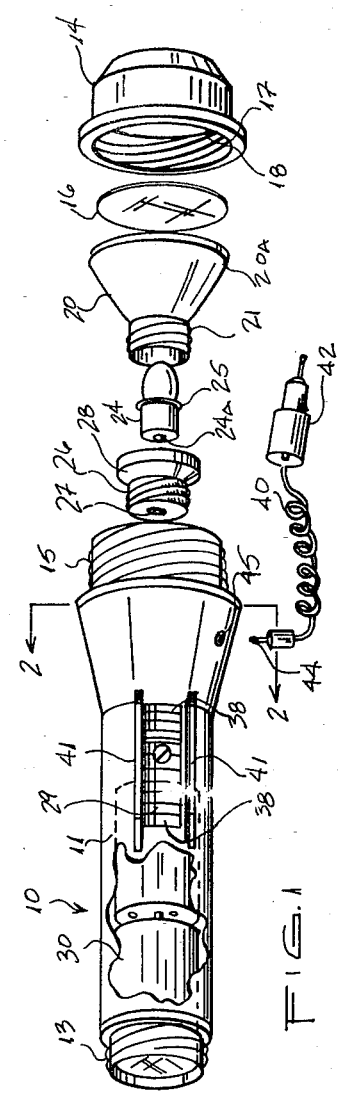

U.S. Patent  Apr. 13, 1982  Sheet 2 of 2  4,325,107
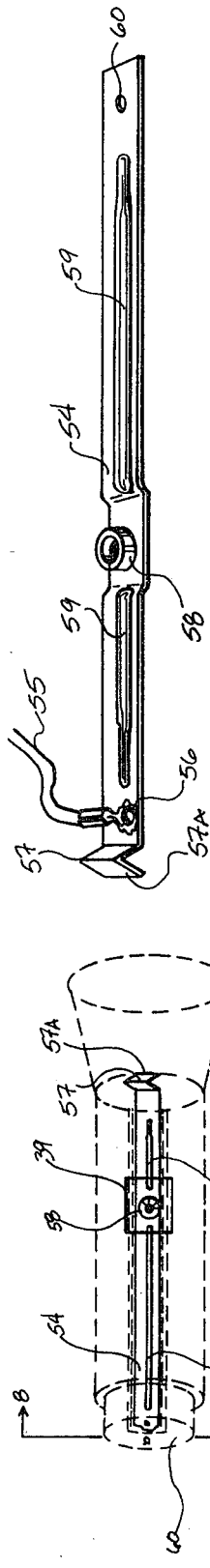
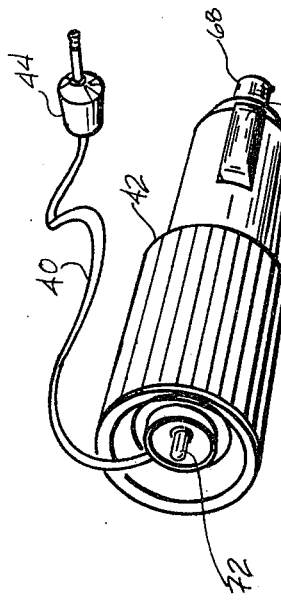
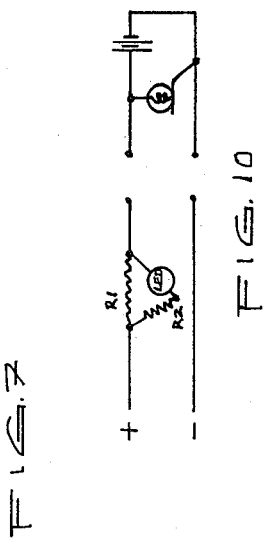
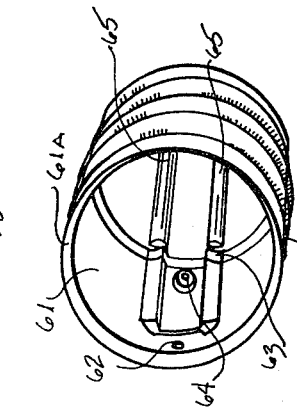
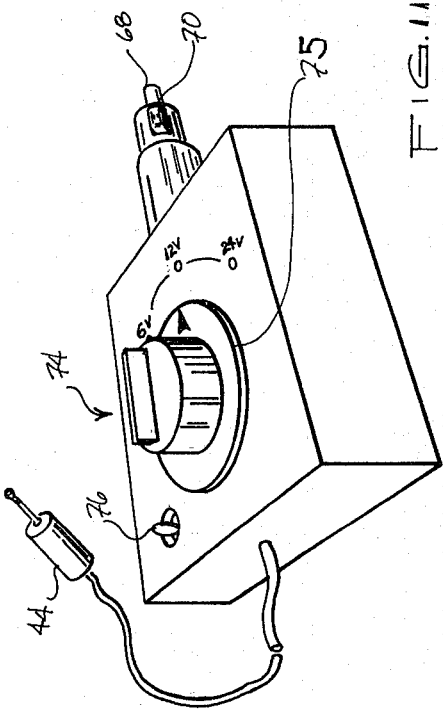
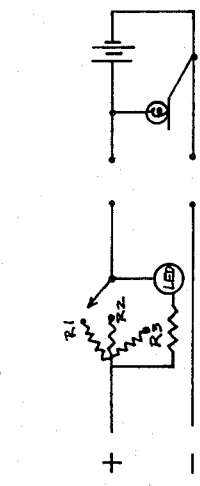

RECHARGEABLE FLASHLIGHT

BACKGROUND OF THE INVENTION

Heretofore, the known rechargeable flashlights have generally been expensive to fabricate, did not adequately protect the flashlight bulb against mechanical shock, had poor electrical contacts in their on-off switch mechanisms causing flickering and dimming of the light bulb, had complex recharging means and were lacking means to securely retain a spare light bulb within the flashlight's end cap.

These and other deficiencies of the prior art are overcome by the present invention which utilizes a flashlight casing molded of dielectric material having an integral cross-member in the casing forming a fixed partition between the batteries and the flashlight bulb, a simple phono jack and mating phono plug for supplying recharging energy to the flashlight batteries, an internal fore and aft movable bus bar for closing the electrical circuit with the light bulb holder and for receiving recharging current from the phono jack, and, a flexible holder for a spare light bulb.

The invention will be more completely understood from the following detailed description taken in conjunction with the accompanying drawing.

BRIEF DESCRIPTION OF THE DRAWING

FIG. 1 is an exploded perspective view partially broken away of a flashlight embodying the principles of this invention;

FIG. 2 is a perspective view taken along the section 2—2 of FIG. 1 illustrating the interior cross-member, bus bar, phono jack and electrical connections thereof;

FIG. 3 is an enlarged perspective view of the flashlight rear end cap and the components of a spare light bulb holder;

FIG. 4 is a rear end view along the section 4—4 of FIG. 1, illustrating the spare bulb as mounted in the spare light bulb holder;

FIG. 5 is another exploded perspective view of the reflector and light bulb assembly shown in FIG. 1;

FIG. 6 is a perspective view of a current carrying bus bar;

FIG. 7 is a phantom side view of the flashlight casing and the interiorly mounted bus bar;

FIG. 8 is a perspective view along the section 8—8 of FIG. 7, illustrating a metal sleeve interiorly attached to the rear end of the casing;

FIG. 9 is a perspective view of a recharging cord assembly;

FIG. 10 is a schematic illustration of the electrical circuitry present in the recharging cord assembly illustrated in FIG. 9;

FIG. 11 is a perspective view of another recharging cord assembly which is switch adjustable to receive charging current at various voltages and to selectively reduce such voltages to those required by the batteries for safe charging; and, FIG. 12 is a schematic illustration of the electrical circuitry present in the recharging cord assembly illustrated in FIG. 11.

Referring now to FIG. 1, there is shown as a preferred embodiment of the invention a rechargeable flashlight assembly 10, which comprises a tubular casing 11, molded from a dielectric material such as a polypropylene, high density polythylene, a polyurethane, a nylon, a polycarbonate, a polysulfone, a polyacrylate, a acrylonitrile-butadiene-styrene polymer, or a vinyl halide polymer or copolymer. A presently preferred dielectric material is polypropylene for reasons of material economy, mold processability, toughness, and resistance to corrosion. The rear end of casing 11 is closable by end cap 12 formed from a dielectric material and having internal threads 12a for engagement with external threads 13 on the rear end of casing 11.

The front end of casing 11 attaches to bezel 14 having internal thread 18 engageable with external threads 15 on the front end of casing 11. Bezel 14 has an internal annular shoulder 17 to support reflector 20 molded from a dielectric material such as polystyrene or methyl methacrylate. The interior surface of reflector 20 is metalized to provide a light reflective surface. Reflector 20 as shown in FIG. 5, has a non-metalized tubular neck extension 21 provided with external threads 23. An annular shoulder 22 is present in the interior of neck extension 21 against which flange 25 of bulb 24 abuts. Bulb 24, typically a prefocussed miniature bulb such as marketed by General Electric Company under the designation PR series, e.g., PR2 or PR6, is retained within the neck extension by a metal cap 26 having an outwardly flanged portion 28 and a central aperture 27 in its base. Aperture 27 has a diameter just large enough for passage therethrough of only the central terminal 24a and its surrounding insulation of the base of bulb 24. Metal cap 26 has internal threads engageable with external threads 23 on reflector neck extension 21. Thus, when bulb 24 is inserted in neck extension 21 and metal cap 26 is screwed on extension 21, bulb 24 is forced forwardly until its flange 25 bottoms against the reflector's 14 interior shoulder 22 and the bulb's base terminal 24a and its surrounding insulation protrudes through the aperture 27 of metal cap 24. In this position bulb 24 is firmly fastened to reflector 20 and a vibration resistent electrical contact is made between the bulb's metal base and the interior base portion of bulb retainer metal cap 26.

A flat lens 16 of glass or preferably breakage-resistant clear plastic material such as cellulose acetate, vinyl polymers, a polycarbonate or polymethyl methacrylate is positioned within bezel 14 and abuts against the interior bezel shoulder 17. Next the assembled combination of bulb retainer cup 26, bulb 24 and reflector 20 are inserted in bezel 14 and against the rear surface of lens 16 and this assembly is then screwed onto threaded portion 15 of casing 11 whereby bezel 14 presses the annular rim portion 20a of reflector 20 against the front end of casing 11.

Batteries 30 within casing 11 are urged forwardly against terminal 50 in rigid cross-member 47 to provide a substantially vibration-free electrical contact therewith by conical compression spring 36 having an upwardly and inwardly terminal bent end 37. Spring 36 abuts against the rim flange 32 of cup 31 which is preferably a metal stamping and also is of such base diameter that at least the last turn of spring 36 is compressed against the internal bottom thread 12a of end cap for thereby retaining cup 31 within end cap 12. Cup 31 also serves as a spare bulb holder. When rear end cap 12 is screwed onto the threaded rear end section 13 of casing 11, it compresses conical spring 36 against the bottom surfaces of the rearmost battery 30 in casing 11, and rim flange 61a of a metal sleeve 61 attached to the interior of casing 11 as shown in greater detail in FIG. 8. Upward and inward on the base turn of spring 36 extends over flange surface 61a of metal sleeve 61 and assures a symmetrical positive electrical contact with flange surface 61a when end cap 12 is screwed onto threaded end portion 13 of casing 11.

Intermediate the length of the casing 11 are two integral outer parallel ribs 41, 41 which function as guards against accidental movement of a rectangular shaped switch plate 29, preferably of dielectric material. Switch plate 29 covers a rectangular opening 39 in the casing 11 (as more readily seen in FIG. 7). Switch plate 29 is screw fastened to a threaded boss 58 attached to current carrying bus bar 54 and is movable fore and aft except as limited by integrally molded stops 38, 38 on casing 11. Parallel ribs 41, 41, functioning as switch guards are provided to protect the switch plate 29 when the flashlight is dropped and to keep switch plate 29 from being inadvertently turned on when the flashlight is placed in a user's pocket or accidentally brushed against an external object. These ribs also restrict the flashlight from rolling more than about 320° when placed on a sloping surface. Sloping the front and rear portions of ribs 41, 41 aids in inserting and removing the flashlight from a user's pocket or other places of storage. Also tapering the end cap 12 facilitates entry of the flashlight into a user's pocket.

Also shown in FIG. 1 is a recharging extension cord assembly 40 comprising a phono plug 44 insertable in phono jack 45 which is permanently affixed to casing 11. Phono plug 44 is connected via an electrical extension cord to a receptacle 42 containing a current limiting resistor in one of the electrical leads contained therein and an LED (light emitting diode) 72. The terminal end of receptacle 42 is adapted to be inserted in the conventional cigarette light receptacle, usually mounted on a vehicle's dashboard, for receiving charging current from the vehicle's storage battery or electrical system via central electrode 68 and compressible spring electrde 70, the latter further serving as a retention means for securing receptacle 42 in the conventional cigarette lighter receptacle.

Referring to FIG. 2 there is shown the interior electrical circuit arrangement at the front end of casing 11 associated with integral cross-member 47 on which is mounted flexible metal leaf spring 48 and retained thereon by central metal eyelet or rivet 50 which extends rearwardly through cross-member 47 to form a projecting electrical terminal for making contact with the post terminal of the foremost battery 30 in casing 11. Also connected by rivet or eyelet 50 is flexible positive electrical lead 51 whose other end is connected to the positive contact in phono jack 45. The other flexible lead (negative) 55 from phono jack 45 is electrically attached to bus bar 54 by rivet or eyelet 56. As can be seen in FIG. 2 cross-member 47 is so configurated as to provide an open space 52 for access therethrough of bus bar 54 and rivet or eyelet 56. Flat leaf spring 48 is deflected rearwardly when brought into contact with post terminal 24a of light bulb 24, when the assembly of bezel 14, reflector 20, bulb 24 and bulb retainer cap 26 is screwed onto the front end of casing 11.

FIGS. 3 and 4 illustrate further details of the spare light bulb holder 31. As shown in FIG. 3, the flexible tab 34 has a dumbbell shape, having two wide end portions joined to a narrow mid-portion 34B. One end portion has an aperture 34A of such size that when it is elastically distended permits entry therein of the base of spare bulb 35 until flange 35A of bulb 35 abuts against the planar surface of tab holder 34. After insertion of bulb 35, tab 34 firmly contracts around the bulb base to securely hold the bulb against accidental dislodgment. Tab holder 34 is die-cut or otherwise formed from a flexible elastic sheet of natural or synthetic rubber stock having typically a nominal thickness, e.g. of about 0.10 inch. Other flexible elastic materials which can be used to form tab holder 34 include but are not limited to low density polyethylene, plasticized polyvinyl chloride, polyurethane, flexible ABS polymers and natural or synthetic leathers. Assembly of the spare bulb 35 in tab holder 34 and metal cap bulb holder 31 is a simple operation beginning with insertion of bulb 35 into aperture 34A at one end of tab 34, followed by squeezing together the ears of the other end of tab 34 sufficiently to enable it to pass through aperture 33. After such passage has been made, the ears flatten out, locking the tab at its neck portion 34B in aperture 33.

Referring next to FIG. 5 additional detail is illustrated of the internal configuration of bezel 14 with respect to its internal shoulder 17 and internal threads 18, of the rim flange 20A and internal annular shoulder 22 of reflector 20 and internally threaded metal cap 26.

FIG. 6 illustrates details of metal bus bar 54 which could not be conveniently shown in FIGS. 1 and 2. Bus bar 54 is economically formed by a stamping operation on sheet metal stock, preferably brass because of its relatively good flexibility, corrosion resistance and electrical properties, but may be made of any other suitable metal known in the art. As shown in FIG. 6, the mid portion of bus bar 54 has attached thereto a boss 58 internally threaded to receive a screw for attachment thereto of switch plate 29. Longitudinal ribs 59, 59 are formed during the stamping operation and serve to stiffen bus bar 54. One end 57 of bus bar 54 is bent in a zig-zag shape to provide a leaf spring action when bus bar 54 is moved forwardly in the casing for its end 57A to make contact with the shoulder 28 on bulb retainer cap 26. Adjacent to zig-zag portion 57 is a terminal 56 making electrical contact with bus bar 54. Attached to terminal 56 is lead 55 which extends to and is in contact with phono jack 45. At the other end of bus bar 54 a raised dimple 60 was formed during the stamping operation. The function of dimple 60 will be more clearly understood by reference to FIG. 8.

As shown in FIG. 8, the rear end of casing 11 has a close fitting metal sleeve 61 permanently attached thereto by rivet 62. Sleeve 61 has an annular rim surface 61A having a diameter the same as the diameter of casing 11. Rim surface 61A on sleeve 61 abuts against the rear end of casing 11. A portion of the wall surface of sleeve 61 is inwardly deformed to provide a channel 63 between the outer surface of sleeve 61 and the inner surface of casing 11 to accommodate passage therein for the dimpled end of bus bar 54. When bus bar 54 is inserted in channel 63 far enough for dimple 60 to engage a corresponding dimple 64 in the inwardly deformed surface of sleeve 61, the bus bar is frictionally held in place, and in such position end 57A of bus bar 54 is disengaged from contact with annular shoulder 28 on bulb retaining cap 26, providing a positive disconnect and holding the switch in an "off" position. Conversely when bus bar 54 is moved forwardly whereby its end 57A makes electrical contact with annular shoulder 28, and dimple 60 disengages from sleeve dimple 64, there still remains an electrical contact between the dimpled end of bus bar 54 and metal sleeve 61 since forward motion of bus bar 54 is stopped by forward switch stop 38 on the outside of casing 11 before bus bar 54 can emerge completely from channel 63. In this position dimple 60 on bus bar 54 bears against the outer surface of sleeve 61 and the inner surface of casing 11 in a tight friction fit providing a low resistance electrical contact and positively holding the switch in the "on" position. The parallel interior molded ribs 65 in casing 11 provide a channel therebetween for obtaining proper installation alignment therein of bus bar 54 and also function as spacers preventing wear contact between bus bar 54 and batteries 30.

The rechargeable cord assembly 40 illustrated in FIG. 9 comprises a tubular casing 42 of dielectric material adapted to be plugged into a vehicle's cigarette lighter receptacle. The central electrial terminal 68 on casing 42 normally makes contact with the positive lead from the vehicle's storage battery and/or electrical system is spring biased to provide a tight fit in the cigarette lighter receptacle. An extension cord connects casing 42 to phono plug 44 which is engageable with the phono jack 45 in the flashlight casing 11. An LED (light emitting diode) 72 is provided in the rear end of casing 42 and when illuminated serves to indicate charging current is being accepted by the batteries in flashlight casing 11. The interior of casing 42 contains a current limiting resistor $R_1$ in the circuit to reduce the current received from the vehicle's electrical system to a safe level for recharging the batteries in the flashlight, as well as a shunt resistor $R_2$ establishing a forward current and a forward voltage condition applicable for proper functioning of the LED in the circuit. Resistor $R_1$ preferably has a resistance value providing a trickle charge which can be maintained indefinitely without damaging the rechargeable batteries 30.

FIG. 10 is a schematic illustration of the electrical circuitry employed in recharging cord assembly 40. Resistor $R_1$ in the circuit is a current limiting resistor having a resistance value capable of dropping the source current to a current recommended by the battery manufacturer to safely charge any given number of rechargeable batteries series connected within the flashlight casing 11. For example, with a 12 volt automobile electrical system as the charging source, and two 1.25 volt nickel-cadmium rechargeable batteries such as those made by General Electric Company, designated model GC3 Size D and having a recommended charging current of 80-100 MA) in series relationship within the casing, a resistor $R_1$ of 100 ohms is used to yield a trickle charge rate of 95 MA. If the vehicle system is a 24 volt system as used in many trucks, resistor $R_1$ should have resistance of 225 ohms to provide a similar trickle charging rate. It will be understood as the number of series connected rechargeable batteries in the circuit is increased, a proportionally lower resistance value is permissible in resistor $R_1$.

The formula for determining resistor size is:

$$I_{ch} = (E_s - E_b)/R$$

Wherein $I_{ch}$ equals charging current recommended by the battery manufacturer, $E_s$ equals source voltage (vehicle electrical system) $E_b$ equals flashlight battery voltage (design voltage of each cell times number of cells in series); and, R equals the current limiting resistance in ohms.

The LED 72 in the illustrated circuit of FIG. 10 require a bias resistor $R_2$ in order to reduce current to that required by the LED manufacturer. Other light signalling means may be employed such as liquid crystals, diodes and the like.

FIG. 11 illustrates another embodiment of a recharger cord assembly which is more versatile in operation than the assembly 40 illustrated in FIG. 9. The embodiment in FIG. 11 comprises a multi-resistor container 74 having a plug with negative and positive terminals 70 and 68 respectively for insertion in a cigarette lighter receptacle. Container 74 is designed to switch select a specific current limiting resistor to obtain a suitable trickle charging rate from a charging source of 6, 12, or 24 volts. As shown in the schematic circuit of FIG. 12, each of resistors $R_1$ $R_2$ and $R_3$ have one of their leads connected to a common junction, with the positive lead from terminal 68. The other end lead of each resistor remains open until individually contacted by switch lever 75 which is pivotable on a pivot pin, not shown. One of the two leads from container 74 to phono plug 44 is grounded to said pivot pin. The other lead from terminal 70 passes through container 74 and terminates in phono plug 44.

Although FIG. 12 illustrates a single bias resistor for the LED, it is to be understood that in the event the particular LED used in the circuit will not function satisfactorily with any one of the specific charging voltages, then additional bias resistors can be included in multi-resistor container 74 enabling a specific bias resistor to be switch selected in the same manner as indicated for resistors $R_1$, $R_2$ and $R_3$.

The rechargeable flashlight herein described and illustrated in the drawing is characterized by rugged construction and electrical reliability meeting the requirements of a wide spectrum of users including among others security personnel, plant maintainance workers, meter readers, campers, repairmen, bicyle riders, police and fire personnel and safety inspectors. All such users require flashlights resistant to breakage of the light bulb as from accidental falls of the flashlight to a hard surface. Features of the presently disclosed flashlight enhancing resistance to light bulb breakage include the presence of cross-member 47 in casing 11 serving as a rigid partition separating the rechargeable batteries from the light bulb 24 and preventing any movement of the batteries from directly impacting against the base of bulb 24. Furthermore, it is to be particularly observed that bulb 24 is not in direct contact with cross-member 47, but only with shock absorbing flexible leaf spring 48. Thus, bulb 24 is completely mechanically isolated from the pressure exerted by the conventional conical spring used in many conventional flashlights which force the enclosed batteries into a electrical contact with the base contact of the light bulb.

Resistance to shock damage also extends to spare bulb 35 secured in tab holder 34 and metal cup 31. This was demonstrated by testing the herein disclosed spare bulb containing rechargeable flashlight in accordance with Military Specification F37447D, paragraph 4.6.14. The flashlight of this invention survived 13 drops from a height of 12 feet into a box of 2'×2' dimensions filled with sand, without spare bulb 35 jarring loose from flexible tab holder 34. Furthermore, upon manual removal of bulb 35 from holder 34, its filament was found to be undamaged as demonstrated by it lighting up when attached to a source of electricity. Such satisfactory performance was not obtained in the instance of conventional spare bulb holders using metal clips of metal fingers to hold the spare bulb, none of which completely encircled the bulb's base. All such metal holders would release the spare bulb in much less than 13 drops, and the released bulb frequently showed separation of the glass bulb from its metal base due to impact received after the bulb separated from the metal holder.

Ruggedness of the interior electrical circuitry in the rechargeable flashlight of this invention stems from the co-presence of the current carrying bus bar 54 within the flashlight casing having continuous electrical contact with interior metal sleeve 61 and only on-off contact with shoulder 28 on metal bulb retaining cap 26, the arrangment and configuration of bulb retaining metal cap 26 for holding bulb 24 in the neck extension 21 of reflector 20 to provide a secure electrical contact between the bulb's base and the retaining cap 26, central terminal 50 extending through an aperture in cross-member 47 and by the low resistance electrical contact made when the outer turn of coil spring 36 is compressed between flange surface 61A of sleeve 61 and bend 37A on end of conical spring 36 when end cap 12 is screwed onto threaded surface 13 of casing 11. Each of these features insures a continuous current at maximum voltage to the filament of bulb 24 to provide a non-flickering, non-dimming light output no matter how roughly the flashlight is manipulated by the user.

Another user important convenience is the recharging extension cord assembly providing for easy access to the interior circuitry of the flashlight via the phono plug, phono jack connection and to a recharging source such as a vehicle battery via a cigarette lighter receptacle or equivalent receptacle. The extension cord assembly is further characterized by the presence in the circuit of a suitable current limiting resistor having a resistance such that with respect to the voltage of the charging source versus the series voltage of the rechargeable batteries in the flashlight casing, a non-destructive safe charging rate is maintained. Other features enhancing the electrical reliability of the recharging operation are the permanent interior electrical connections from the phono jack respectively to bus bar 54 and to central terminal 50 on cross-member 47. A further electrical feature is the presence of an LED (light emitting diode) in the recharging extension cord assembly to provide a visible signal that the recharging circuit is functioning properly. If during the recharging cycle it is desired to use the flashlight, i.e. have the bulb illuminated, the recharging extension cord can conveniently remain plugged into the cigarette lighter receptacle without harm to the rechargeable batteries or to the light bulb. However under such circumstances little or no recharging of the batteries will take place, depending on the current drawn by the bulb.

Although the novel rechargeable flashlight of this invention has been described and illustrated as containing two rechargeable batteries, it is to be understood that the principles of this invention are applicable to single battery rechargeable flashlights as well as flashlights having 3, 4, 5, or more rechargeable batteries. And while rechargeable nickel-cadmium batteries are preferred for use in the practice of this invention because of their excellent recovery from deep cycle discharging, the use of rechargeable lead-acid batteries is not precluded even though care must be used to avoid frequent deep cycle discharges. Also, the invention has been described with reference to the presence of a plastic reflector having a metalized reflecting surface because such reflectors are more easily fabricated than all metal reflectors which can be used if desired. The tubular all plastics casing 11 is superior to a metal casing because of its resistance to being dented or otherwise when dropped or physically abused which frequently happens with the average thin wall metal casings of conventional flashlights causing misalignment of switch contacts and difficulty in removing or replacing worn out batteries. Another very important reason for using a dielectric plastic material for the casing, end cap and bezel is to provide user protection against electrical shock when the flashlight is used around exposed electrical equipment such as switch boxes, motors, and other electrical equipment carrying lethal voltages. Further, such all plastic flashlights are corrosion resistant for use around corrosive chemicals.

Preferably, the phono jack 45 is covered on the exterior surface with a dielectric plastic material such as one listed herein to provide a flashlight with no exposed electrically conductive surface. Also, a plastic phono jack with interior metal surfaces will work in this invention.

Although cross-member 47 has been described as a dielectric material, it may, if desired, be fabricated from a metal imbedded in the interior wall of casing 11.

It is to be understood that although the invention has been described in terms of a presently preferred embodiment, modifications and changes in the construction and arrangement of the parts of the preferred embodiment may be made by those skilled in the art while retaining, however, the principles and advantages of the invention. All such modifications, changes variations and other uses and applications which do not depart from the spirit and scope of the invention are deemed to be covered by the invention which is limited only by the claims which follow.

What is claimed is:

1. A rechargeable flashlight comprising in combination a tubular casing of dielectric material for receiving therein at least one rechargeable battery,
    said casing having a rear end portion threaded for screw engagement with an end cap and a forward end portion threaded for screw engagement to a light bulb and reflector cap assembly,
    a metal sleeve attached to the inner surface of the casing adjacent to said first mentioned threaded portion,
    said sleeve having a flange overlapping the end of the casing and an inwardly formed indentation providing a slot between the sleeve and the inner surface of the casing for receiving and making electrical contact with one end of a current carrying bus bar,
    a cross member of rigid material attached to the inner wall of the casing between the foremost battery in the casing and the light bulb reflector cap assembly,
    said cross member having an electrical terminal therethrough in alignment with the post terminal of the foremost battery in the casing and a cut-out adjacent to the inner wall of the casing for entry of a bus bar,
    a metal spring attached to the terminal on said cross member in such manner that the free end of the spring makes electrical contact with the central terminal in the base of a light bulb,
    a rear end cap of dielectric material having interior threads engageable with the threaded rear end section of the casing and an interior annular shoulder, a cup positioned in said rear end cap and having an exterior rim flange bearing against the annular shoulder of the rear end cap, a conical metal spring having its base nestled in said cup with a terminal bend in the end of the outermost coil for making contact with said metal sleeve flange and its apex positioned against the bottom terminal of the rearmost battery in the casing, a current carrying bus bar positioned against the interior surface of the casing and extending from the indentation in the metal sleeve, through the cut-out in the casing's cross member and to a threaded metal cup bulb retainer in a light bulb reflector cap assembly, means exterior of the casing for moving said bus bar fore and aft to respectively make and break electrical contact with said bulb retainer, a light bulb and reflector cap assembly comprising an internally threaded bezel of dielectric material, a lens, a reflector having an externally threaded tubular neck extension and an interior shoulder in said neck extension, a flanged light bulb and a metal cup bulb retainer with internal threads for engagement with the threads on the reflector's neck extension for screwing the flange surface of the light bulb against the interior shoulder in said neck extension, said threaded metal cup having a central aperture in its base whereby the central terminal and its surrounding dielectric insulation at the base of the light bulb protrudes therethrough to make electrical contact with the metal spring attached to the terminal in the cross member, and a phono-jack affixed to the tubular casing for accepting a phono plug attached to a D.C. charging source for recharging the batteries in the casing, said phono-jack having one electrical lead therefrom attached to the metal bus bar and its other electrical lead attached to the electrical terminal on the cross member of the tubular casing.

2. A rechargeable flashlight as recited in claim 1 wherein the cup positioned in the rear end cap has a central aperture, said end cap having a cavity extending rearwardly from the end cap's annular shoulder to provide storage space therein for a spare light bulb, and a tab holder of flexible non-metallic shock absorbing material for retaining said spare light bulb, said tab holder having one end thereof extending through the cap aperture to the coil spring and the other end extending into the end cap cavity and having an aperture therein for insertion of a spare bulb.

3. A rechargeable flashlight as recited in claim 2 wherein said tab holder has a dumbbell shape providing a narrow mid-section shape and enlarged end sections, one end section having an opening for insertion and retention of the spare light bulb's base and the other end section being of such dimensions that when flexed it can be squeezed through the aperture in said cup and thereafter elastically flatten out to thereby position the tab's narrow mid-section in the cup's aperture and lock the tab in the metal cup.

4. A rechargeable flashlight as recited in claim 1 wherein the base of the conical metal spring terminates in an upward and inward turn to the axis of the conical spring.

5. A rechargeable flashlight as recited in claim 1 in combination with an extension cord having two electrical leads terminating at one end of the cord in a phono plug mating with the phono-jack in the flashlight casing and at the other end in a receptacle adapted to be connected to a D.C. energy source, said receptacle having interposed in one of the two electrical leads a current limiting resistor effective to reduce the charging source current to a level insuring satisfactory recharging of the rechargeable batteries in the flashlight casing.

6. The combination of a rechargeable flashlight with a recharging extension cord as recited in claim 5 wherein the receptacle attached to the extension cord contains an indicator light connected to one of its two leads in series-shunt relationship.

7. The combination of a rechargeable flashlight with a recharging extension cord as recited in claim 5 wherein the receptacle attached to the extension cord contains a plurality of current limiting resistors of selected resistance values, each being connected to a common input lead from the D.C. charging source and the output leads of each resistor being selectively individually tapped by a switch in electrical contact with one of the two leads terminating in the phono plug whereby a resistor can be switch selected and connected in the charging circuit which provides the proper charging current for the particular rechargeable batteries and number thereof in the battery circuit vis-a-vis the voltage of the D.C. charging source.

8. A rechargeable flashlight as recited in claim 1 wherein the dielectric material of the casing, rear end cap, casing cross-member, bezel, and light reflector is a polymeric dielectric material.

9. A rechargeable flashlight as recited in claim 8 wherein the cross-member is integrally molded to the casing, tow integrally molded parallel ribs run axially along the interior wall of the casing and are spaced apart to provide a channel for the bus bar.

10. A rechargeable flashlight as recited in claim 8 wherein the dielectric material of the casing, rear end cap, cross-member in the casing, and the bezel is polypropylene.

11. A rechargeable flashlight as recited in claim 1 containing rechargeable nickel-cadmium batteries.

12. A rechargeable flashlight as recited in claim 1 wherein the current carrying bus bar has a stiffening rib along a major portion of its length, and internally threaded boss attached thereto at an intermediate portion of its length for receiving a screw for attachment to said boss of an external switch actuating means.

13. A flashlight spare bulb assembly comprising in combination a cup having an external rim flange, a central aperture and dimensioned to nestle within a flashlight rear end cap, a tab shaped holder of flexible material for the spare bulb, said tab holder having a dog-bone shape providing a narrow mid-section shape and enlarged end sections, one end section having an opening for insertion and retention of the spare light bulb's base, the other end section being of such dimensions that on flexure it can be squeezed through the central aperture of the metal cup and thereafter flatten out to thereby position the tab's narrow mid-section in the metal cup's aperture and lock the tab in the metal cup.

* * * * *

UNITED STATES PATENT OFFICE
CERTIFICATE OF CORRECTION

Patent No. 4,325,107　　　　　Dated April 13, 1982

Inventor(s) Richard H. MacLeod

It is certified that error appears in the above-identified patent and that said Letters Patent are hereby corrected as shown below:

In the Abstract -- Line 21, "photo" should be "phono"
In the Abstract -- Line 26, "improvement" should be "improvements"

Col. 2, Line 68, after "inward" should be "bend 37"

Col. 3, Line 38, "electrde" should be "electrode"

Col. 6, Line 67, "of" should be "or"

Col. 8, Line 2, after "otherwise" should be "deformed"

Col. 10, Line 38, "tow" should be "two"

Signed and Sealed this

Fourteenth Day of September 1982

[SEAL]

Attest:

GERALD J. MOSSINGHOFF

Attesting Officer　　Commissioner of Patents and Trademarks